Figure 1:
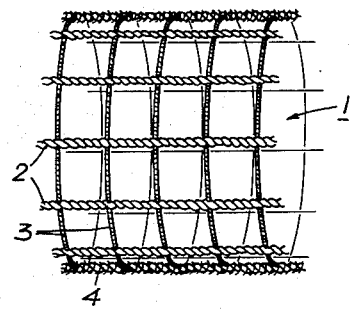

April 20, 1965  H. HÄMMERLE  3,178,910
NET FOR WRAPPING UP SAUSAGES AND MEAT PRODUCTS
Filed March 12, 1962

INVENTOR
HERMANN HÄMMERLE
BY
HIS ATTORNEYS 3,178,910
NET FOR WRAPPING UP SAUSAGES AND
MEAT PRODUCTS
Hermann Hämmerle, 20 Kettenbruckengasse,
Vienna, Austria
Filed Mar. 12, 1962, Ser. No. 178,920
Claims priority, application Austria, Mar. 14, 1961,
A 2,133/61
7 Claims. (Cl. 66—170)

This invention relates to a net for wrapping up sausages and meat products, particularly hard sausages, smoked rolled ham and pressed ham or the like, in the form of a tubular open-mesh fabric.

Up to now, the production of sausages, rolled ham and the like has included the steps of winding a string around the sausage pulp stuffed in natural or artificial skins, or around the smoked meat products, by hand and thereafter tying it up. This envolves a great deal of manual labour and often causes distortion of the product, when the distance between the coils varies a little, so that irregular shapes result. When such products are cut into slices, the string wrapping is cut through, the whole system is loosened, and the goods lose the desired attractive appearance. With sausages it has also been necessary to use thick and strong skins in order to avoid the risk of bursting during the wrapping and the further processing.

The object of the present invention is to avoid these disadvantages and difficulties. The invention proposes a net for wrapping up sausages and meat products which is characterized in that the warp strings of the net are made of non-elastic material, and the weft strings of the net (peripheral strings) are made of elastic material, particularly cotton and/or cell wool covered rubber strings.

The warp-extending strings may preferably consist of looped chains made of one or several threads. Suitably the connection betwen the warp chains and the weft strings is woven, that is to say the weft strings are passed through loops of the warp chains. The net may consist of oblong areas or cells. Suitably also two weft strings may be arranged between two warp strings in the form of an X. The weft strings are fastened to a longitudinal seam of the tubular net in such manner that on slicing up the product, whereby the longitudinal seam is cut through, the remaining knit system is preserved, i.e., the meshes of the net are not undone.

The following advantages are attained with the net proposed according to the invention:

For filling in the sausage pulp, thin skins having only a poor specific strength may be used. The net imparts to the products a compact shape and good resistance to distortion, which properties are maintained during boiling and smoking. The labour expenditure for the wrapping up is extraordinarily little. Preferably the net according to the invention is applied by stretching it on a tube of larger diameter than the sausage, sewing or tying up the starting end of the net and feeding the sausage through the tube by means of a ram which may be machine-driven, if desired. The sausage emerging from the tube drags along the expanded net and is wrapped up with the net in this manner, extending the warp strings. The elastic weft strings cling closely to the periphery of the sausage which is straightened out thereby.

Meat products, particularly rolled ham and the like, also may be wrapped with advantage with the casing according to the invention. Up to now, smoked goods such as ham and rolled ham were tied up by hand only. In the case of pressed ham special molds were employed in which the pieces of ham were kept under pressure for some time in order to give them the desired shape. Large parts of the surface were open to insect infestation. This is not hygienic and may cause the goods to deteriorate. By the use of the casing according to the invention the mentioned disadvantages are reliably avoided. Ham and rolled ham may be first enclosed without being substantially compressed in a cellophane cover (smoke-permeable) or with a similar cover of plastic material, which may be impregnated, and in this condition are wrapped up in the elastic net according to the invention. Wrapping is preferably carried out by stretching the net to the desired diameter, either by hand or by means of a stretching device, and introducing the prepared piece of meat. On releasing the stretching device the weft strings are drawn close to the periphery of the piece of meat which is pressed and given a compact shape. Thus the use of molds is unnecessary. The pieces of meat are smoked and/or cooked in the encased condition, maintaining their shape all the same. Suitably, twofold or threefold weft strings are used for nets intended for wrapping up pieces of meat, to ensure that sufficient pressure is exerted on the piece of meat.

A preferred embodiment of the invention comprises a special design of the warp strings. When the warp strings are made only of cotton or cell wool threads, the specific rigidity of the warp strings sometimes is not sufficient. It may happen that the net elements (warp and weft strings) are displaced in respect to each other so that irregular net cells result. Another problem resides in the desire to render the nets more readily slidable over the product than what is usual with looped chains of cotton or wool. One attempted solution has been to wax the cotton threads in order to obtain the desired effect. However, the effect of this measure is often insufficient. In order to comply with this special requirement it is proposed, according to the preferred embodiment of the invention, that the warp strings of the net contain a plastic yarn or wire. Suitably the warp strings of the net consist of two interknitted chains, one of the chains being made of cotton or cell wool threads and the other chain being made of the plastic yarn or wire. As a plastic material polyethylene, particularly low-pressure polyethylene, which can be easily produced in food quality and is resistant to boiling and smoking, has proved particularly satisfactory.

A further embodiment of the invention comprises the use of a certain kind of elastic material, of which the weft strings (peripheral strings) are made. This embodiment of the invention provides the use of rubber of food quality, i.e. rubber which is free from dissoluble ingredients affecting the flavour and aroma. The following composition may be recommended:

Natural caoutchouc, particularly in the form of a light crêpe;
Colloidal sulphur;
Zinc oxide in an amount that a maximum content in the rubber of 1% zinc is not exceeded, and/or colloidal silica, as fillers;

Thiuram compounds, particularly dimethyl diphenyl thiurambisulphide, in an amount not exceeding 3% and/or guanide compounds, particularly o-tolyl biguanide, in an amount not exceeding 1.8%, as vulcanization accelerating agents.

The particular choice of ingredients, as listed above, their quantitative restriction and the provision that other substances should be excluded in the production of the rubber, ensure a constant quality. A net wrapper having weft strings made of this kind of rubber can be boiled together with the victual, e.g. rolled ham or the like, for hours, even under pressure, without affecting the flavour of the broth.

Figure 2:
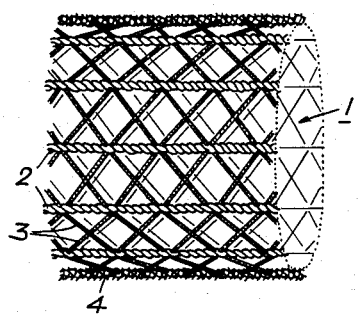
Figure 3:
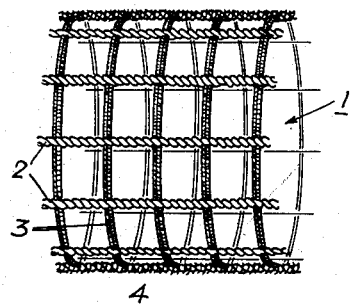
Figure 4:
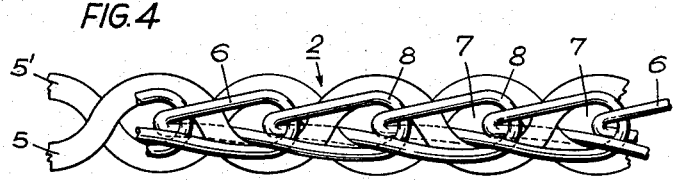

The net according to the invention is illustrated in detail in the drawing, which shows several embodiments. FIGS. 1 to 3 are perspective views, FIG. 4 is an inside plan view of a warp chain, i.e. seen from the inside of the net casing (meat side), on an enlarged scale In FIG. 1 numeral 1 designates a net having warp strings 2 consisting of looped chains of cotton and/or cell wool threads. The weft strings 3 are made of rubber strings covered with cotton and/or cell wool. These materials are resistant to boiling and smoking. The weft strings are connected with the warp strings, under formation of oblong areas, by passing the weft strings through loops of the longitudinal chains. The knit system is joined by a longitudinal seam 4 to form a tube. The weft strings are fastened to the longitudinal seam of the tubular fabric in such manner, e.g. by continuous knotting, that the knit system is not undone after the longitudinal seam has been cut through.

FIG. 2 shows a modified embodiment wherein two weft strings are arranged between two warp strings in the form of an X.

The embodiment according to FIG. 3, which is intended mainly for wrapping up meat products, such as ham, stands out for particularly strong, double weft strings.

In FIG. 4 the preferred design of the warp strings is illustrated on an enlarged scale: The looped warp strings 2 consist of cotton or cell wool threads 5, 5' and an interknitted plastic yarn or wire 6. Two undulating cotton threads 5, 5' lie on top of each other, enclosing holes 7 between them. A plastic yarn or wire 6, which is stitched to loops 8 to form a continuous chain, is passed through two adjacent holes 7, every link of the chain (loop member) being thus interlocked with the two cotton threads 5, 5'. In this way the interknitted, double chain is formed.

As is evident from FIG. 4 which shows the inside view of a warp chain, essentially only the fully inked parts of the plastic yarn or wire are in surface contact with the sausage or the piece of meat, respectively, while the dotted parts of the yarn 6 lie on the outside. Thus, the inside face of the net, that is, the side which contacts the meat or sausage, in drawing up the same on the sausage or the piece of meat is formed mainly by the surfaces of the plastic loops. Inasmuch as plastic, particularly polyethylene, has a lower friction than cotton or cell wool or even waxed cotton, drawing up of the net on the meat product is more readily accomplished. The plastic yarn or wire imparts to the warp strings of the net a sufficient specific rigidity so that it can be easily handled. Hence special advantages result, particularly for mechanical drawing-up devices. An essential advantage of this embodiment resides in the better distortion resisting or counteracting properties of this net. The junctions between the warp strings and the weft strings have a higher stability, and the net elements are not displaced in respect of each other. As plastic material, particularly polyethylene, shrinks a little upon being heated, the resistance to distortion and compactness of shape of the packaged product are particularly satisfactory with meat products which are cooked or smoked after wrapping.

Although the above described preferred embodiment of the invention proposes warp strings consisting of both cotton threads and a plastic yarn, it is obvious that the invention also comprises nets having warp strings made either of cotton or cell wool alone or of plastic alone.

What I claim is:

1. A tubular net for wrapping sausages, meat products and the like, comprising substantially non-elastic warp strings and elastic weft strings, the substantially non-elastic warp strings comprising looped chains of substantially non-elastic yarns, and the elastic weft strings being of food quality rubber consisting essentially of
    (a) natural caoutchouc in the form of a light crepe;
    (b) colloidal sulphur;
    (c) at least one filler selected from the group consisting of zinc oxide and colloidal silica, the maximum level of zinc oxide being that which gives a zinc content in the rubber of 1%; and
    (d) a vulcanization accelerating agent selected from the group consisting of thiuram compounds and guanide compounds, the thiuram compounds being present at a level not exceeding 3% and the guanide compounds being present at a level not exceeding 1.8%, the rubber strings being covered with a yarn selected from the group consisting of cotton and cell wool yarns.

2. The net of claim 1, wherein the thiuram compound is dimethyl diphenyl thiurambisulfide.

3. The net of claim 1, wherein the guanide compound is o-tolyl biquanide.

4. A knitted tubular net comprising a plurality of separate spaced-apart non-elastic warp strings, said warp strings consisting of looped knitted chains of substantially non-elastic yarns and elastic weft strings extending transversely with respect to the warp strings and peripherally about the tubular net, said weft strings being passed through loops of said looped chains to engage them therewith and said weft strings consisting of yarn-covered rubber threads, the rubber of said threads being of food quality.

5. A net according to claim 4 wherein said weft strings are passed through spaced-apart loops of said looped chains and are disposed substantially parallel to each other.

6. A knitted tubular net comprising substantially non-elastic warp strings, said warp strings consisting of looped knitted chains of substantially non-elastic yarns, at least one of said yarns being of plastic material and providing a surface on the inner face of the net having a low coefficient of friction, and elastic weft strings extending transversely with respect to the warp strings and peripherally about the tubular net, said weft strings being passed through loops of said looped chains to engage them therewith, and said weft strings consisting of yarn-covered rubber threads, the rubber of said threads being of food quality.

7. A knitted tubular net comprising substantially non-elastic warp strings, said warp strings consisting of looped knitted chains of substantially non-elastic yarns, and elastic weft strings, said weft strings being passed through loops of said looped chains to connect them thereto, and said weft strings consisting of yarn-covered rubber threads, the rubber of said threads consisting essentially of
    (a) natural caoutchouc in the form of a light crepe;
    (b) colloidal sulfur;
    (c) at least one filler selected from the group consisting of zinc oxide and colloidal silica, the maximum level of zinc oxide being that which gives a zinc content in the rubber of 1%; and
    (d) a vulcanization accelerating agent.

(References on following page)

References Cited by the Examiner

UNITED STATES PATENTS

| | | | |
|---|---|---|---|
| 1,520,162 | 12/24 | Vittori et al. | 66—9 |
| 2,114,021 | 4/38 | Guoy | 66—172 |
| 2,174,924 | 10/39 | McCleary | 99—174 |
| 2,213,720 | 9/40 | Seim | 66—1 |
| 2,237,277 | 4/41 | Williams et al. | 99—174 |
| 2,587,117 | 2/52 | Clay | 66—193 X |
| 2,610,496 | 9/52 | Kostopoulos | 66—176 |
| 2,652,705 | 9/53 | Weinberg | 66—193 |
| 2,672,139 | 3/54 | Casper | 87—2 |
| 2,706,898 | 4/55 | Gross et al. | 66—193 |
| 2,723,588 | 11/55 | Wheatcroft | 87—2 |
| 2,747,392 | 5/56 | Sadinoff et al. | 66—193 |
| 2,996,905 | 8/61 | Scheibe | 66—192 |
| 3,118,294 | 1/64 | Van Leathem | 66—193 |

FOREIGN PATENTS

| | | |
|---|---|---|
| 546,325 | 7/56 | Italy. |
| 578,583 | 6/58 | Italy. |

RUSSELL C. MADER, *Primary Examiner.*